United States Patent [19]

Newman et al.

[11] Patent Number: 5,468,818
[45] Date of Patent: Nov. 21, 1995

[54] SYNDIOTACTIC VINYLAROMATIC POLYMERIZATION PROCESS USING LOW HYDROGEN PARTIAL PRESSURES

[75] Inventors: Thomas H. Newman, Midland; Karen K. Borodychuk, Mt. Pleasant, both of Mich.

[73] Assignee: The Dow Chemical Company, Midland, Mich.

[21] Appl. No.: 402,446

[22] Filed: Mar. 13, 1995

[51] Int. Cl.$^6$ .............................. C08F 4/64; C08F 12/08
[52] U.S. Cl. ........................ 526/170; 526/151; 526/160; 526/347; 526/905
[58] Field of Search ................................ 526/160, 170, 526/151, 905

[56] References Cited

U.S. PATENT DOCUMENTS

| | | |
|---|---|---|
| 4,990,580 | 2/1991 | Ishihara et al. ........................ 526/160 |
| 5,037,907 | 8/1991 | Imabayashi et al. . |
| 5,254,647 | 10/1993 | Yamamoto et al. . |

Primary Examiner—Fred Teskin

[57] ABSTRACT

A process for preparing syndiotactic polymers of vinylaromatic monomers comprising contacting one or more vinylaromatic monomers with a catalyst system comprising a pentamethylcyclopentadienyltitanium based metal complex capable of preparing syndiotactic vinylaromatic polymers under coordination polymerization conditions in the presence of hydrogen gas at a hydrogen partial pressure from 10 to 45 kPa and maintaining said partial pressure of hydrogen continuously throughout the polymerization.

4 Claims, 3 Drawing Sheets

SYNDIOTACTIC VINYLAROMATIC POLYMERIZATION PROCESS USING LOW HYDROGEN PARTIAL PRESSURES

BACKGROUND OF THE INVENTION

The present invention relates to a process for producing vinylaromatic polymers having a high degree of syndiotacticity. More particularly, the present invention relates to such a process that is capable of forming such polymers in an efficient manner using hydrogen gas to improve catalyst efficiency.

It is previously known in the art to prepare vinylaromatic polymers having a high degree of syndiotacticity. In U.S. Pat. Nos. 5,037,907 and 5,254,647 suitable reactor designs, catalysts and processing conditions are taught.

In U.S. Pat. No. 4,990,580, the use of hydrogen at a partial pressure within the range of 0.01 to 50 kg/cm$^2$ (1 to 5000 kPa) in order to control the molecular weight of the resulting syndiotactic vinylaromatic polymer product was taught. The reference did not indicate any benefit in catalyst efficiency in the use of hydrogen pressures within any particular range. The examples did not utilize extremely small hydrogen pressures and the reference did not indicate any importance in maintaining a relatively constant but low hydrogen pressure throughout the polymerization.

For the teachings contained therein, the foregoing U.S. patents are herein incorporated by reference.

SUMMARY OF THE INVENTION

Figure 1:
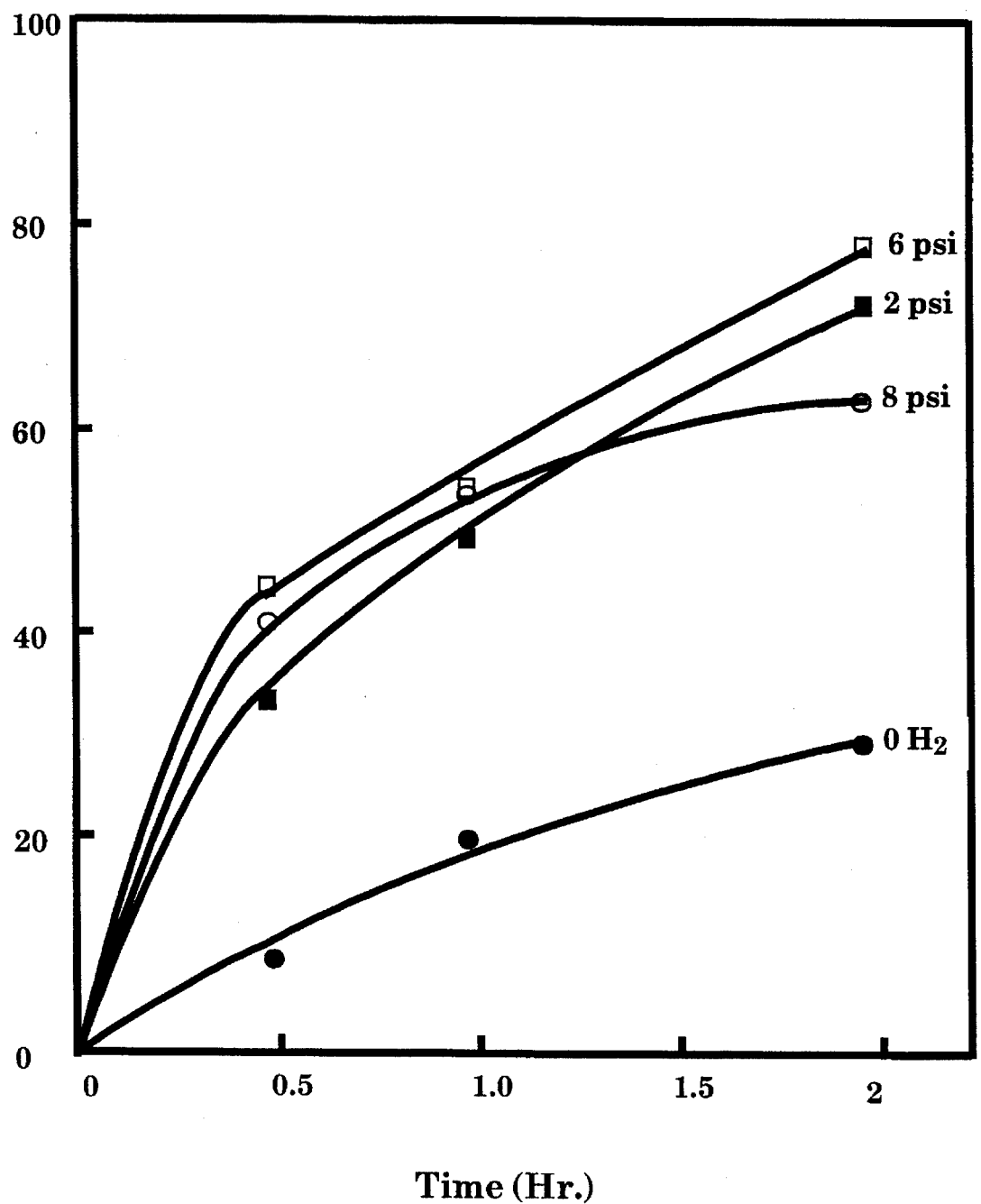
FIGS. 1–3 depict in graphic form the polymerization results of Examples 1–3 respectively.

According to the present invention, there is provided an improved polymerization process for preparing syndiotactic polymers of vinylaromatic monomers comprising contacting one or more vinylaromatic monomers and one or more catalyst systems comprising a pentamethylcyclopentadienyltitanium based metal complex capable of preparing syndiotactic vinylaromatic polymers under coordination polymerization conditions in the presence of hydrogen gas at a hydrogen partial pressure from 10 to 45 kPa and maintaining said partial pressure of hydrogen continuously throughout the polymerization.

DETAILED DESCRIPTION OF THE INVENTION

According to the present invention it has now been discovered that the pressure of hydrogen used during the polymerization of vinylaromatic monomers to form syndiotactic polymers thereof using pentamethylcyclopentadienyltitanium based metal complexes should be extremely low. According to the invention, improved catalyst efficiencies are achieved by operation in the above mentioned range and by use of the specifically recited pentamethylcyclopentadienyltitanium based metal complexes. Moreover, it has further been found desirable to maintain the hydrogen pressure in the previously disclosed range throughout the polymerization. That is, previously disclosed polymerization processes have taught the addition of hydrogen gas to the reactor at the beginning of the polymerization, but have not disclosed any benefit to the further addition of hydrogen during the polymerization to maintain the partial pressure within the previously disclosed range. If the benefit in improved catalyst efficiency is to be realized, it has now been found necessary to employ pentamethylcyclopentadienyltitanium based metal complexes and to operate in the herein disclosed range of hydrogen pressure during substantially the entire polymerization process.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering Groups.

The term "polymer" as used herein refers to a polymeric compound prepared by polymerizing monomers alone or in combination. The generic term polymer thus embraces the term "homopolymer", employed to refer to polymers prepared from only one monomer, and the term interpolymer which refers to polymers prepared by the polymerization of at least two different monomers.

Suitable vinylaromatic polymers prepared according to the present invention include homopolymers or interpolymers of a vinylaromatic monomer represented by the formula: ArCH=CH$_2$, wherein Ar is phenyl or a phenyl group substituted with from 1 to 5 radicals selected from the group consisting of halo, alkyl, and haloalkyl. Exemplary vinylaromatic monomers include styrene, vinyl toluene, t-butyl styrene, chlorostyrene and bromostyrene (with respect to substituted styrene monomers, all isomers individually or in admixture are included). Preferred syndiotactic vinylaromatic polymers include syndiotactic polystyrene and syndiotactic copolymers of styrene and p-vinyltoluene containing up to 25 percent vinyltoluene by weight.

Preferred syndiotactic polymers are such polymers having a degree of syndiotacticity as measured by a racemic triad of the $^{13}$C NMR spectrum of at least 75 percent, and most preferably at least 90 percent.

The resulting syndiotactic vinylaromatic polymer preferably has a weight-average molecular weight of 10,000 to 2,000,000, more preferably from 20,000 to 1,000,000 with a number-average molecular weight of 5,000 to 1,000,000, more preferably 5,000 to 500,000. The syndiotactic vinylaromatic polymer preferably has a crystalline melting point from 150° to 270° C.

Suitable catalyst systems employed in the present polymerization process include any pentamethylcyclopentadienyltitanium based metal complex that is active in the polymerization of vinylaromatic monomers to form polymers of high syndiotacticity. Generally such catalyst systems comprise such a metal complex and one or more activating cocatalysts.

More particularly such catalyst systems comprise the following component or components:

A)
1) at least one metal complex corresponding to the formula: Cp*TiX$_3$X'$_q$ wherein:
   Cp* is pentamethylcyclopentadienyl;
   X independently each occurrence is a monovalent anionic moiety having up to 20 nonhydrogen atoms, provided however that in no occurrence is X an aromatic or nonaromatic anionic group that is n-bonded to M; alternatively, two X groups together may form a divalent, dianionic moiety having both valences bound to M, or further alternatively, one or more X groups may be bonded to one or more X' groups thereby forming a moiety that is both covalently bonded to M and coordinated thereto by means of Lewis base functionality;

X' independently each occurrence is a neutral ligating compound having up to 20 nonhydrogen atoms; and q is 0, 1 or 2;

and 2) an activating cocatalyst, the molar ratio of 1) to 2) being from 1:10,000 to 100:1;

or

B) the reaction product formed by converting 1) to an active catalyst by use of an activating technique.

The metal complexes used in the present invention may be formed by reacting a metal precursor compound lacking the present Cp* group and containing one or two leaving groups, with Group 1 or 2 metalated derivative of such Cp* group. Suitable leaving groups include halide, hydrocarbyloxy, siloxy, sulfonate and carboxylate leaving groups. The procedure is analogous to those disclosed in *J. Am. Chem. Soc.* 107, 5016 (1985) or *Angew. Chem., Intr. Ed. Engl.*, 27, 1099 (1988) and *J. Am. Chem. Soc.*, 104, 3737 (1982). Optionally, one or more neutral ligating compounds such as phosphines, phosphites, amines, carbon monoxide, or ethers may be present during the reaction or may be added later. The reaction is conducted in a suitable noninterfering solvent at a temperature from −100° C. to 300° C., preferably from −78° to 100° C., most preferably from 0° to 80° C. Suitable reaction media for the formation of the complexes are aliphatic and aromatic hydrocarbons and halohydrocarbons, ethers, and cyclic ethers. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, xylene, styrene and the like, $C_{1-4}$ dialkyl ethers, $C_{1-4}$ dialkyl ether derivatives of (poly)alkylene glycols, and tetrahydrofuran. Mixtures of the foregoing are also suitable.

The recovery procedure involves separation of the resulting alkali metal or alkaline earth metal salt and devolatilization of the reaction medium. Extraction into a secondary solvent may be employed if desired. Alternatively, if the desired product is an insoluble precipitate, filtration or other separation technique may be employed.

Suitable X groups include: halide (fluoride, chloride, bromide and iodide, especially chloride), hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 nonhydrogen atoms. Preferred X groups are chloride, OR, and $NR_2$, where R independently each occurrence is a hydrocarbyl or silyl group of up to 10 nonhydrogen atoms. Especially suited X groups are methoxy, phenoxy, isopropoxy, and dimethylamido.

Preferred X' groups are phosphines, especially trimethylphosphine, triethylphosphine, triphenylphosphine, trifluorophosphine and bis(1,2-dimethylphosphino)ethane; phosphites, especially trimethyl phosphite, triethyl phosphite, and dimethylphenyl phosphite; ethers, especially tetrahydrofuran; amines, especially pyridine, bipyridine, tetramethylethylenediamine (TMEDA), and triethylamine; and carbon monoxide.

Preferred coordination complexes used according to the present invention are complexes corresponding to the formula: $Cp*TiX_3$, wherein:

X is chloride, $C_{1-6}$ hydrocarbyl or $C_{1-6}$ hydrocarbyloxide.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or diisobutylalumoxane; strong Lewis acids, such as, $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)-borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718 now abandoned), EP-A-520,732 (equivalent to U.S. Ser. No. 07/876,268), and EP-A-520,732 (equivalent to U.S. Ser No. 07/884,966 filed May 1, 1992 now U.S. Pat. No. 5,350,723), the teachings of which are hereby incorporated by reference.

Suitable nonpolymeric, inert, compatible, noncoordinating, ion forming compounds useful as cocatalysts in one embodiment of the present invention comprise a cation which is a Bronsted acid capable of donating a proton, and an inert, compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula: $(L*—H)^+_f(A^{f-})$ wherein:

L* is a neutral Lewis base;

$(L*—H)^+$ is a Bronsted acid;

$A^{f-}$ is a noncoordinating, compatible anion having a charge of f−, and f is an integer from 1 to 3.

More preferably f is one, that is $A^{f-}$ is $A^-$. Highly preferably, $A^-$ corresponds to the formula: $[BQ_4]^-$ wherein:

B is boron in the +3 formal oxidation state; and

Q independently each occurrence is selected from hydride, dialkylamido, halide, alkoxide, aryloxide, hydrocarbyl, and halosubstituted-hydrocarbyl radicals, said Q having up to 20 carbons with the proviso that in not more than one occurrence is Q halide.

In a most preferred embodiment, Q is a fluorinated $C_{1-20}$ hydrocarbyl group, most highly preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are trisubstituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium) tetrakis(pentafluorophenyl)borate, trimethylammonium tetrakis(2,3,4,6-tetrafluorophenylborate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluoropheny)borate, and N,N-dimethyl-(2,4,6-trimethylanilinium) tetrakis-(2,3,4,6-tetrafluorophenyl)borate;

dialkyl ammonium salts such as: di-(i-propyl)ammonium tetrakis(pentafluorophenyl)borate, and dicyclohexylammonium tetrakis(pentafluorophenyl)borate; and tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate.

Preferred are N,N-dimethylanilinium tetrakis(pentafluorophenyl)borate and tributylammonium tetrakis(pentafluorophenyl)borate.

Another suitable nonpolymeric, inert, compatible, noncoordinating, ion forming, activating cocatalyst comprises a salt of a cationic oxidizing agent and a noncoordinating, compatible anion represented by the formula: $(Ox^{e+})_f(A^-)_e$ wherein:

$Ox^{e+}$ is a cationic oxidizing agent having a charge of e+;
e is an integer from 1 to 3; and
$A^{f-}$, and f are as previously defined.

Examples of cationic oxidizing agents include: ferrocenium, hydrocarbyl-substituted ferrocenium, $Ag^+$, or $Pb^{+2}$. Preferred embodiments of $A^{f-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula: $©^+A^-$
wherein:

$©^+$ is a $C_{1-20}$ carbenium ion; and
$A^-$ is as previously defined. A preferred carbenium ion is the trityl cation, i.e. triphenylcarbenium.

A further suitable ion forming, activating cocatalyst comprises a compound which is a salt of a silylium ion and a noncoordinating, compatible anion represented by the formula:

wherein:

$R^1$ is $C_{1-10}$ hydrocarbyl,
h is a number from 0 to 3, and
X' and $A^-$ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem.Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. patent application Ser. No. 08/304,314, filed Sep. 12, 1994, the teachings of which are hereby incorporated by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference. Preferred complexes include phenol, especially fluorinated phenol adducts of tris(pentafluorophenyl)borane. The latter cocatalysts are disclosed and claimed in U.S. patent application Ser. No. 08/304,306, filed Sep. 12, 1994, the teachings of which are hereby incorporated by reference.

The foregoing activating techniques and ion forming cocatalysts are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

An especially preferred activating cocatalyst comprises the combination of a trialkyl aluminum compound having from 1 to 4 carbons in each alkyl group and an ammonium salt of tetrakis(pentafluorophenyl)borate, in a molar ration from 0.1:1 to 1:0.1, optionally containing up to 1000 mole percent of an alkylaluminoxane.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0° to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter electrode respectively). Suitably materials of construction for the cell are glassy plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is a noncoordinating, compatible anion.

Examples of cations, $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl group, especially tetra-n-butylammonium tetrakis(pentafluorophenyl) borate.

The molar ratio of catalyst/cocatalyst employed preferably ranges from 1:10,000 to 100:1, more preferably from 1:5000 to 10:1, most preferably from 1:200 to 1:1.

Preferred activating cocatalysts are methylalumoxane (MAO), $C_{1-10}$ trihydrocarbylammonium tetrakis(pentafluorophenyl)borate compounds, perfluorinated triarylborane compounds, or mixtures thereof.

The polymerization is conducted at temperatures from 25°–85° C. and pressures from atmospheric to 50 psi (345 kPa). A support for the catalyst, especially silica, alumina, or a polymer (especially polytetrafluoroethylene or a syndiotactic polyvinylaromatic compound) may be employed, if desired. Generally however, the catalyst system is employed in a homogeneous manner. In most polymerization reactions the molar ratio of catalyst:vinylaromatic monomer is from $10^{-12}:1$ to $10^{-1}:1$, more preferably from $10^{-12}:1$ to $10^{-5}:1$.

Suitable diluents for use in the polymerization are inert liquids especially aromatic compounds such as benzene, toluene, ethylbenzene, xylene and the like. Additional diluents that may be used to cool the reaction through the latent heat of vaporization, especially low boiling aliphatic compounds such as butane, pentane, isopentane, and hexane may also be present if desired. Finally, gasous, inert diluents, especially nitrogen, argon or helium may be present in the reaction mixture to assist in preventing oxygen entry to the reactor. Preferably a positive pressure from 0.1 to 100 psi (0.7 to 700 kPa) above ambient is desirable inside the reactor to retain the reaction mixture under inert reaction conditions.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

EXAMPLE 1

All reactions and manipulations were carried out under inert atmosphere in a dry box. The reagents, toluene, styrene, and p-methylstyrene were purified by sparging with $N_2$ and passing through activated alumina and handled using standard inert atmosphere techniques. Catalyst solutions were prepared in volumetric flasks using toluene. The required amounts of a 10 weight percent methylalumoxane (MAO) solution, 1M triisobutylaluminum (TIBA) and a 0.03M solution of pentamethylcyclopentadienyltitanium trimethoxide were mixed in a dry box in volumetric flasks. The mole ratios of MAO:TIBA:Ti were 75:25:1 with a final concentration of the catalyst solution, based on titanium, of 0.003M.

Polymerizations were carried out in septum capped, crimp sealed ampoules. The ampoules were charged with 5 ml of a mixture of styrene and p-methylstyrene (4 weight percent). Hydrogen was introduced into the ampoule throughout the polymerization via a needle connected to a hydrogen gas manifold of known pressure. For comparative purposes polymerizations were also conducted in the absence of hydrogen. The ampoules were then equilibrated for 10 minutes at 50° C. in a water bath. The polymerization was initiated by addition of the desired amount of catalyst solution described above. The mole ratio of styrene to titanium was 700,000:1. The polymerizations in certain ampoules were quenched by the addition of methanol after 30 minutes, 1 hour and two hours polymerization. Each polymer sample was isolated and dried in order to determine the percent conversion. All polymers had tacticities of greater than 95 percent based on a racemic triad. Results are depicted in FIG. 1, where it may be seen that the best performance was obtained using hydrogen pressures from 2 to 6 psi (14 to 41 kPa).

EXAMPLE 2

Figure 2:
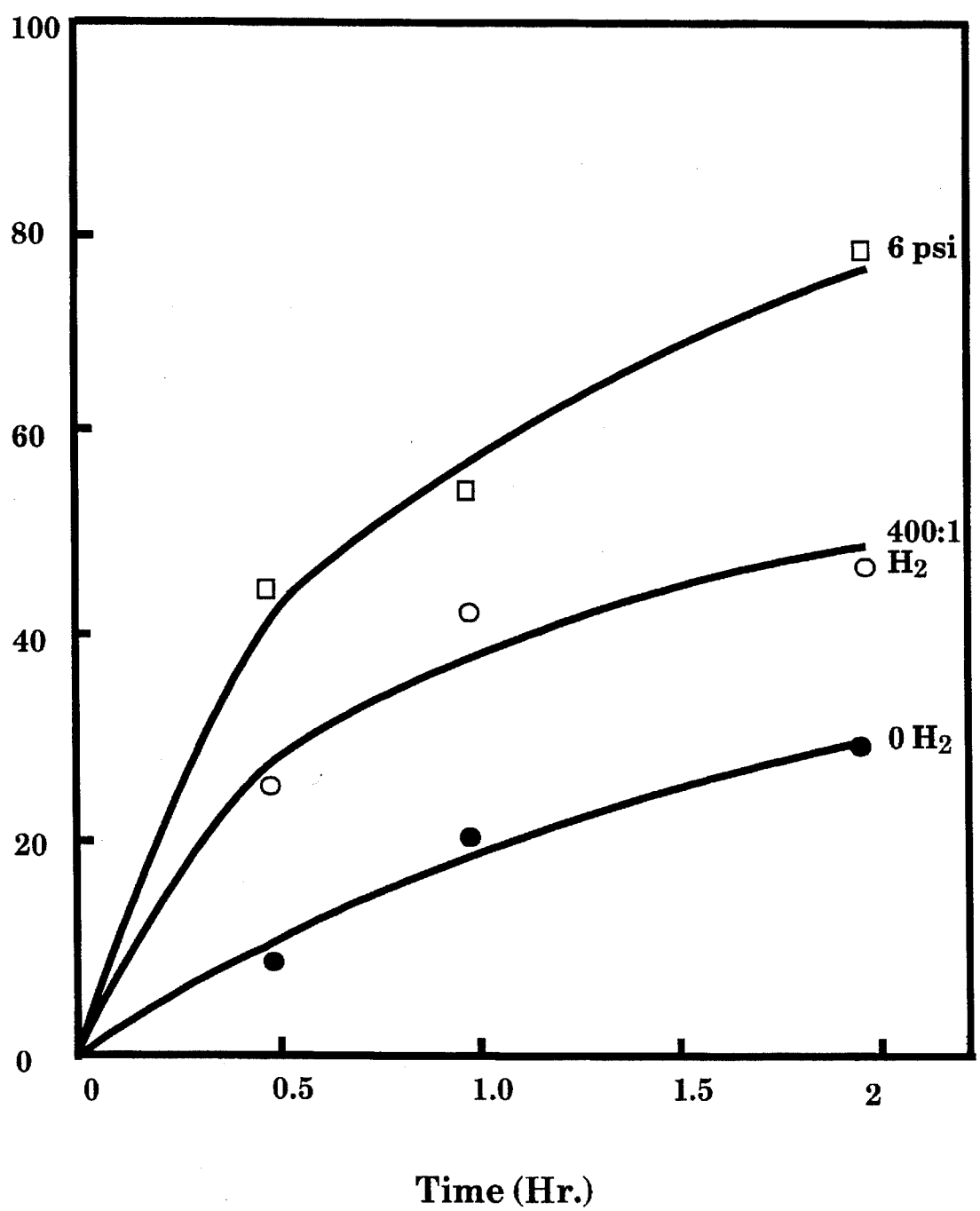

The reaction conditions of Example 1 were substantially repeated using either 6 psi of hydrogen pressure throughout the polymerization, no hydrogen, or by introducing a known volume of hydrogen into the ampoule headspace prior to polymerization to give a molar ratio, $H_2$:monomer, of 400:1. Results are depicted in FIG. 2, where it may be seen that the best performance was obtained at hydrogen pressures of 6 psi (41 kPa).

EXAMPLE 3

Figure 3:
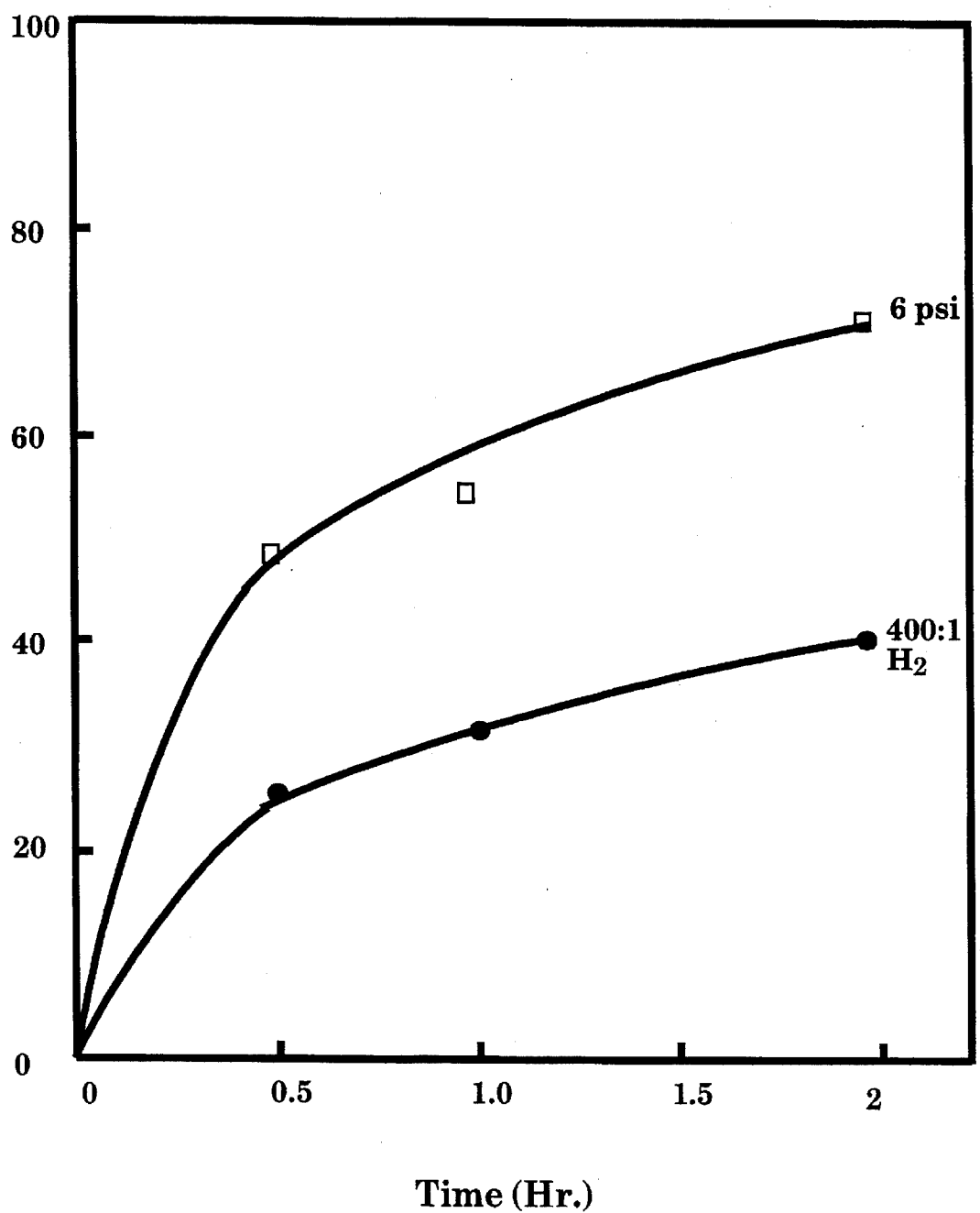

The reaction conditions of Example 2 were substantially repeated using styrene as the only monomer. Hydrogen under 6 psi pressure introduced throughout the polymerization and the use of a known initial volume of hydrogen in the ampoule headspace (400:1 mole ratio based on styrene) were used. Results are depicted in FIG. 3, where it may be seen that the best performance was obtained using hydrogen pressures of 6 psi (41 kPa) continuously during the polymerization.

What is claimed is:

1. A process for preparing syndiotactic polymers of vinylaromatic monomers comprising contacting one or more vinylaromatic monomers and one or more catalyst systems comprising a pentamethylcyclopentadienyltitanium based metal complex capable of preparing syndiotactic vinylaromatic polymers under coordination polymerization conditions in the presence of hydrogen gas at a hydrogen partial pressure from 10 to 45 kPa and maintaining said partial pressure of hydrogen continuously throughout the polymerization.

2. A process according to claim 1 wherein the vinylaromatic monomer is styrene, p-methylstyrene or a mixture thereof.

3. A process according to claim 1 wherein the catalyst system comprises the following components:

A)
1) at least one metal complex corresponding to the formula: $Cp^*TiX_3X'_q$ wherein:

$Cp^*$ is pentamethylcyclopentadienyl;

X independently each occurrence is a monovalent anionic moiety having up to 20 nonhydrogen atoms, provided however that in no occurrence is X an aromatic or nonaromatic anionic group that is n-bonded to M; alternatively, two X groups together may form a divalent, dianionic moiety having both valences bound to M, or further alternatively, one or more X groups may be bonded to one or more X' groups thereby forming a moiety that is both covalently bonded to M and coordinated thereto by means of Lewis base functionality;

X' independently each occurrence is a neutral ligating compound having up to 20 nonhydrogen atoms; and q is 0, 1 or 2;

and 2) an activating cocatalyst, the molar ratio of 1) to 2) being from 1:10,000 to 100:1; or B) the reaction product formed by converting 1) to an active catalyst by use of an activating technique.

4. A process according to claim 3 wherein the catalyst system comprises a metal complex corresponding to the formula, $Cp^*TiX_3$, wherein X is chloride, $C_{1-6}$ hydrocarbyl or $C_{1-6}$ hydrocarbyloxide.

* * * * *